(12) United States Patent
Paluncic

(10) Patent No.: US 7,380,838 B2
(45) Date of Patent: Jun. 3, 2008

(54) CONNECTING DEVICE FOR A PIPE OR SIMILAR

(75) Inventor: Zdravko Paluncic, Ludwigshafen (DE)

(73) Assignee: Lincoln GmbH, Walldorf (DE)

( * ) Notice: Subject to any disclaimer, the term of this patent is extended or adjusted under 35 U.S.C. 154(b) by 104 days.

(21) Appl. No.: 10/530,652

(22) PCT Filed: Apr. 30, 2004

(86) PCT No.: PCT/EP2004/004586

§ 371 (c)(1),
(2), (4) Date: Dec. 6, 2005

(87) PCT Pub. No.: WO2005/001326

PCT Pub. Date: Jan. 6, 2005

(65) Prior Publication Data

US 2008/0018106 A1    Jan. 24, 2008

(30) Foreign Application Priority Data

Jun. 23, 2003 (DE) ............... 203 09 704 U
Jun. 25, 2003 (DE) ............... 203 09 922 U

(51) Int. Cl.
*F16L 21/06* (2006.01)
(52) U.S. Cl. ............... 285/323; 285/307
(58) Field of Classification Search ........... 385/307, 385/313, 314, 322, 323
See application file for complete search history.

(56) References Cited

U.S. PATENT DOCUMENTS

| 3,884,513 | A | * | 5/1975 | Gassert | 285/322 |
| 4,304,426 | A | * | 12/1981 | Francis | 285/323 |
| 4,573,716 | A | * | 3/1986 | Guest | 285/323 |
| 4,645,246 | A | * | 2/1987 | Guest | 285/323 |
| 5,125,694 | A | * | 6/1992 | Gobbi | 285/307 |
| 5,549,865 | A | | 8/1996 | Guests | |
| 6,334,634 | B1 | * | 1/2002 | Osterkil | 285/322 |

FOREIGN PATENT DOCUMENTS

| EP | 0 256 108 | 10/1990 |
| EP | 1 143 185 | 10/2001 |
| GB | 2 165 604 | 4/1986 |
| WO | 87/05087 | 8/1987 |

\* cited by examiner

*Primary Examiner*—David Bochna
(74) *Attorney, Agent, or Firm*—Wenderoth, Lind & Ponack, L.L.P.

(57) ABSTRACT

A connecting device for a pipe comprises a coupling body and a clamping collar. The clamping collar is divided into an axially inner function section and an axially outer actuation section, with a seal positioned between facing front sides of the axially inner function section and the axially outer actuation section. The seal is for sealing against an inner wall of the coupling body and against an outer wall surface of a pipe received within the clamping collar, when the clamping collar is within the coupling body.

20 Claims, 2 Drawing Sheets

CONNECTING DEVICE FOR A PIPE OR SIMILAR

BACKGROUND OF THE INVENTION

The invention relates to a connecting device for a pipe or like fluid conduit, with a coupling body and a clamping collar which can be set into a substantially cylindrical recess of the coupling body in an axially inner starting position and into which, for example after such setting into the recess, one end of the pipe to be connected can be slid, for example, until its front-side abuts a stop of the coupling body. The clamping collar comprises at its inner end at least one radially displaceable arresting tongue, which, when the pipe, and therewith the clamping collar, is slid back in a direction of a recess inlet, for example under pressure building up in the pipe coupling, up into an axially outer arresting position, can be pressed radially inwardly and with its inner side into engagement with an outer wall surface of the pipe through cooperation of an outer side of the arresting tongue with a first slope, radially slanting in the direction of the recess inlet, of an inner wall surface of the coupling body. In this way a plug connection between the pipe or the like fluid conduit can be established and detached simply and rapidly.

In FIG. 1 is depicted in section such a commercially available connecting device in section. In order to produce tightness between connecting devices, between the outer wall surface of the pipe and the inner wall surface of the coupling body an O-ring seal is provided in the recess of the coupling body at the front side of the inner end of the clamping collar. To detach the plug connection, the clamping collar can be slid for example with the aid of an outer flange, from the axially outer arresting position, depicted in FIG. 1, further into the recess of the coupling body up into its axially inner starting position, whereby arresting tongues of the clamping collar spread out of their radially inwardly pressed position due to cooperation with the sealing ring and, optionally, their own reset force and can release again a pipe end. It has been found that, on the one hand, into gaps between the pipe end and clamping collar, as well as between the clamping collar and coupling body, moisture and dirt can penetrate from outside, which makes detaching the plug connection difficult and, on the other hand, when producing and detaching the plug connection scratches and like damage are generated in an outer wall surface of the pipe end, whereby leaks occur under fluid pressure obtained in the connecting device. Based on recognition that these problems occur in practice, an apparent solution was to additionally seal, on the one hand, the pipe end against the clamping collar and, on the other hand, the clamping collar against the coupling body adjacent to the recess inlet, as has also been proposed in EP 1 143 185 A1, with aid of two O-ring seals. Of these two O-ring seals, one is provided between the clamping collar and an inner wall surface of the coupling body, and the other one is provided between the clamping collar and an outer wall surface of the pipe.

However, one problem is still a reliable spreading open of the arresting tongues when the clamping collar is slid in from the arresting position depicted in FIG. 1, since, on the one hand, compliance of a sealing ring at a front side of the clamping collar after ageing and, on the other hand, in absence of sufficient resilient elasticity, a reset force of the resilient tongues do not ensure an adequate spreading out force.

SUMMARY OF THE INVENTION

The invention therefore addresses a problem of implementing a connecting device of the above described type such that with simple, structure, reliable formation and detachment of a plug connection is ensured.

This problem is essentially resolved, for example, according to the invention in that a coupling body has at a front side of a clamping collar a second slope radially slanting toward a recess inlet. When the clamping collar is slid from an axially outer arresting position into an axially inner starting position, this slope cooperates with a front side end of the at least one arresting tongue as a ramp-up slope in order to spread the tongue radially.

According to the invention during a spreading-open process metal faces act mechanically on one another, which determine the spreading-open process securely and reliably. It has unexpectedly been found that an O-ring seal considered necessary according to prior art according to FIG. 1 and according to EP 1 143 185 A1 at the front side of the clamping collar can be omitted, whereby for improved functioning capability of the connecting device according to the invention this structural component is additionally also saved.

Spreading open the arresting tongues for a purpose of detaching the plug connection can still be further improved by having a front side end of the at least one arresting tongue comprising an identically directed tongue slope cooperating with a second slope of the coupling body.

In an event an additional sealing is necessary, the clamping collar adjacent the recess inlet of the coupling body can be sealed, for example by use of two O-ring seals, against an inner wall surface of the coupling body and/or an outer wall surface of the pipe.

For a purpose of reliable arresting, it can further be advantageous to provide the at least one arresting tongue with a sharp edge on its side facing the outer wall surface of the pipe.

In simple implementation of the coupling body the first slope is formed by an annular bead encircling on the inner wall surface of the coupling body.

Of particular advantage for reliable arresting and sealing is disposition of at least two arresting tongues uniformly distributed over a circumference of the clamping collar.

In order to be able to press the clamping collar more simply from an axially outer arresting position into an axially inner starting position in a direction toward an interior of the recess, the clamping collar is usefully equipped with a circumferential flange at its outer end.

Independently of the previously described concept for a solution, in a connecting device of the above cited, thus known, type, but also together therewith, it can be provided that the clamping collar is divided into an inner function section with the at least one arresting tongue, which, when it is slid from the axially outer arresting position into the axially inner starting position, is spread radially outwardly for release of a pipe, and into an outer actuation section, and between front sides, facing one another, of the function section and the actuation section a seal is disposed, implemented for example as an O-ring seal, which provides sealing radially outwardly against an inner wall surface of the coupling body and radially inwardly against an outer wall surface of the pipe.

Hereby is solved the problem in the connecting device according to EP 1 143 185 A1 in that, in addition to a seal disposed at a front-side before the clamping collar, two further O-ring seals are required for sealing a coupling interior axially outwardly.

With the present proposal in the invention therewith a special simplification of structure is attained, which comes to bear in particular when the seal disposed at the front side of the clamping collar is also omitted and spreading-open takes place with aid of metal faces acting on one another.

In order for the actuation section to be retained in the recess of the coupling body, the former can comprise at its axially inner end at least one radially displaceable latching tongue, which with a radially outwardly directed projection engages into a groove opened radially inwardly, and implemented for example as a circumferential groove, in the inner wall surface of the coupling body.

The circumferential groove is preferably of a width, which permits axial displacement of the actuation section to such an extent that the function section can be slid back and forth between its axially inner starting position and its axially outer arresting position.

For reliable seating of the actuation section in the recess of the coupling body, at least two latching tongues are advantageously distributed uniformly over a circumference of the actuation section.

Within the scope of this inventive concept it is further proposed to fabricate the function section of a metal and the actuation section of an elastically compliant material, such as a synthetic material, such that the latching tongues can be lent requisite resilient elasticity. In this embodiment of the invention a circumferential flange can be provided on the actuation section, such that a simple displacement of the actuation section, the O-ring seal and the function section as part of the clamping collar is possible from the axially outer arresting position into an axially inner starting position (release position).

Further aims, characteristics, advantages and application feasibilities are evident based on the following description of embodiment examples in conjunction with drawings. All described and/or graphically represented characteristics by themselves or in any combination form therein the subject matter of the invention independently of their summary in individual claims.

DETAILED DESCRIPTION OF THE PREFERRED EMBODIMENTS

Figure 1:
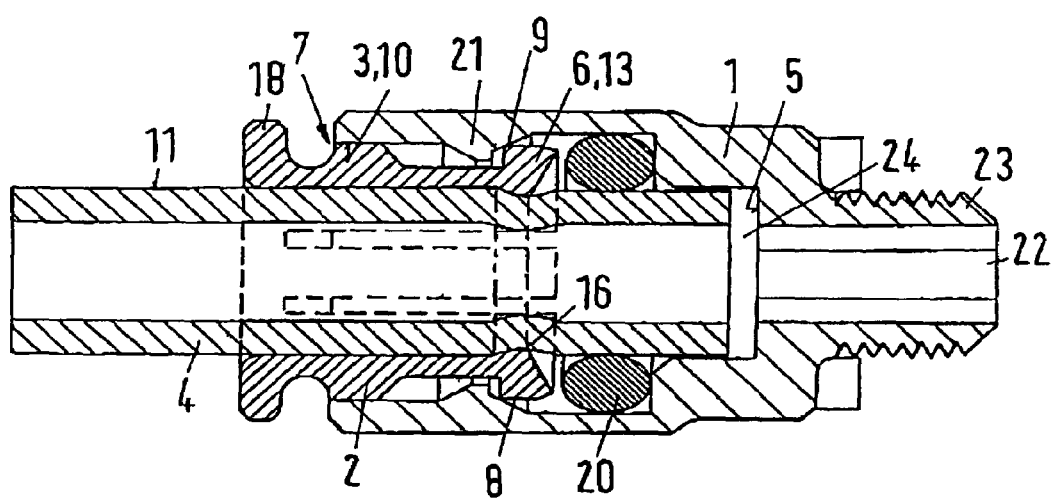
FIG. 1 is a longitudinal sectional view of a connecting device of prior art.

In the following the invention will be explained in further detail in its distinctive aspects in conjunction with connecting devices depicted in FIGS. 2 and 3. It may be stated in advance that in FIG. 1 the same reference symbols are utilized for corresponding structural parts of the connecting device known from prior art.

Figure 2:
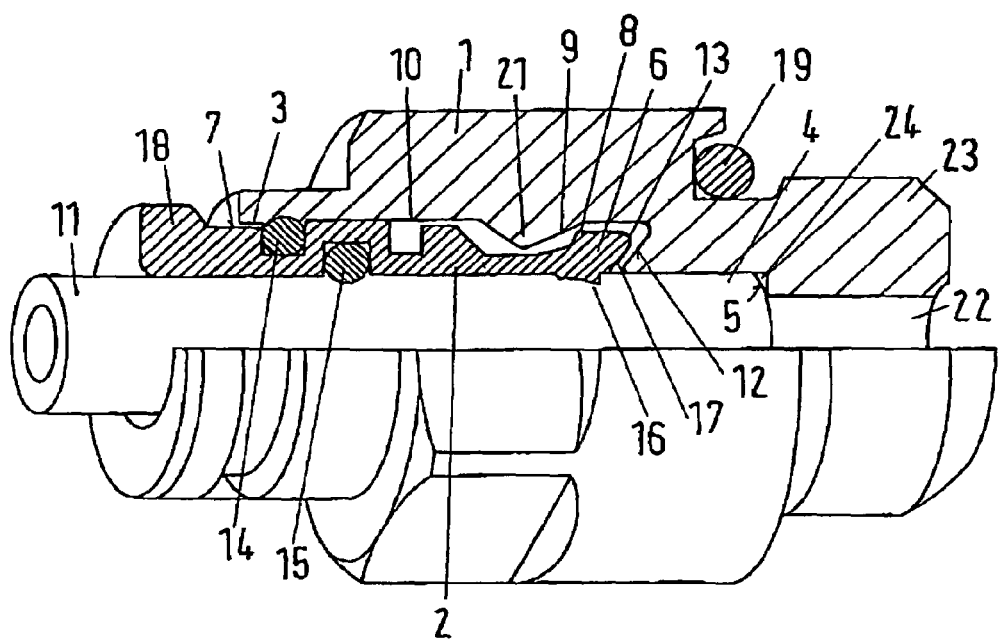
FIG. 2 is a partial sectional view of an embodiment of a connecting device comprising the invention.

The connecting device according to FIG. 2 serves for a plug connection of a pipe 4 or the like fluid conduit with a preferably metallic coupling body 1 such that, through the connecting device a fluid such as a gaseous or liquid medium can be conducted without leakages occurring. The coupling body 1 has a substantially cylindrical recess 3 extending up to an inner shoulder serving as a stop 5 for an end of the pipe 4, which is adjoined by a channel section 22 for passage of the fluid. The channel section 22 passes through a connection piece 23 implemented for example as a threaded connection piece.

The connecting device comprises further an, also preferably metallic, clamping collar 2, which can be set into the recess 3 from a direction of recess inlet 7. The clamping collar 2 comprises at its axially inner end arresting tongues 6 distributed over its circumference or separated from one another by (not visible) axially parallel slots and optionally resiliently elastic. During sliding-in these arresting tongues 6 can be slid with their broadened front-side ends 13 under radial compression past an annular bead 21 implemented on an inner wall surface 10 of the coupling body until the widened front-side ends 13 come to lie in a widening behind an encircling slope 9 radially slanting in the direction of the recess inlet 7. In this way coupling body 1 and clamping collar 2 form a unit which can only be detached by applying force. The end of pipe 4 can subsequently be slid into a cylindrical recess of the clamping collar 2 up to the stop 5 of coupling body 1. When there is a fluid pressure build-up in the connecting device, the end of pipe 4 is minimally displaced from an axially inner starting position on stop 5 in the direction of the recess inlet 7 into an axially outer arresting position depicted in FIG. 2, in which there is a gap 24 between a front side of the end of pipe 4 and stop 5. Pipe 4 therein entrains the clamping collar 2, whereby an outer side 8 of the widened front-side ends 13 of the arresting tongues 6 are pressed under cooperation with first slope 9 radially inwardly, and in this way secure in position the end of pipe 4. For this purpose the arresting tongues 6 have a sharp edge 16 on their inner side facing an outer wall surface 11 of pipe 4.

As is evident in FIG. 2 the coupling body 1 comprises in this embodiment example at a front side of the clamping collar 2 an encircling second slope 12 radially slanting toward the recess inlet 7, which slope during the sliding-in of the clamping collar from the axially outer arresting position depicted in FIG. 2 into an originally assumed axially inner starting position cooperates with the front-side end 13 of the arresting tongues 6 implemented as a ramp-up slope in order to spread open the arresting tongues 6. This special embodiment of the invention is utilized for a simple detachment of the plug connection. FIG. 2 shows further that for securement of this function, the widened front-side ends 13 of each arresting tongue 6 comprise an identically directed tongue slope 17 cooperating with second encircling slope 12 of the coupling body 1. In comparison with FIG. 1, it can be seen that a front-side sealing ring 20 provided according to prior art has been omitted.

However, for inlet-side sealing the clamping collar 2 adjacent the recess inlet 7 of the coupling body 1 can be sealed, for example by use of particular O-ring seals 14, 15, against the inner wall surface 10 of the coupling body 1 and/or outer wall surface 11 of the pipe 4. Hereby, penetration of moisture and dirt from outside and escape of fluid from the connecting device to the outside is additionally avoided.

A circumferential flange 18 provided at an outer end of clamping collar 2 facilitates sliding of the clamping collar 2 into recess 3 from the axially outer arresting position depicted in FIG. 2 inwardly into the axially inner starting position, in which the end of pipe 4 is again released from the arresting tongues 6.

Figure 3:
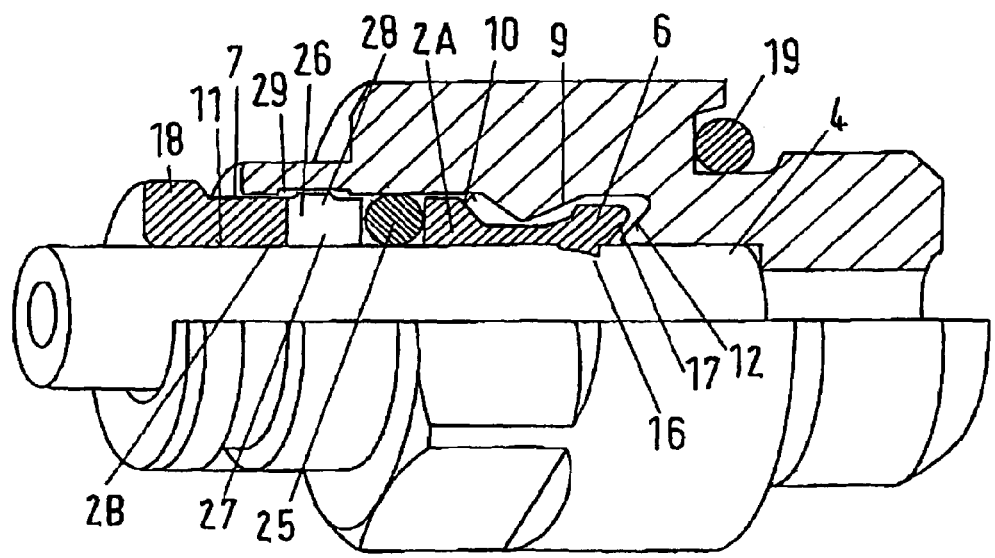
FIG. 3 is a representation corresponding to FIG. 2 of another embodiment of the connecting device comprising the invention.

A connecting device depicted in FIG. 3 follows up a further inventive concept separate from that described so far, but also applicable together therewith. In the connecting device depicted in FIG. 3 clamping collar 2 is divided into two sections axially separate from one another, and specifically into an axially inner function section 2A and an axially outer actuation section 2B. The function section 2A with arresting tongues 6 performs an arresting function and a release function, while the actuation section 2B serves for axial displacement of both sections 2A, 2B from an axially outer arresting position depicted in FIG. 3 into an axially inner starting position, in which pipe 4 is again released from the arresting tongues 6. Between front sides facing one another of function section 2A and actuation section 2B a circumferential seal, implemented as an O-ring seal 25, is disposed, which provides sealing radially outwardly against inner wall surface 10 of coupling body 1 and radially inwardly against outer wall surface 11 of pipe 4. The O-ring seal 25 is therewith located relatively close to recess inlet 7 and axially outside possible scratches, which can be generated at sharp edges 16 of the arresting tongues 6 in the outer wall surface 11 of pipe 4. Sealing against penetration of moisture and dirt, on the one hand, and against leaks of fluid to outside, is therewith reliably ensured, although only a single O-ring seal 25 is required.

The actuation section 2B comprises at its axially inner end radially displaceable latching tongues 26, distributed uniformly over a circumference, which are separated one from another by axial slots 27. These preferably resiliently elastic latching tongues 26 can engage with a projection 28 directed radially outwardly into an inwardly open circumferential groove 29 in the inner wall surface 10 of the coupling body 1.

The circumferential groove 29 is of a width which permits axial displacement of the actuation section 2B to an extent that the function section 2A is displaceable between its axially inner starting position and its axially outer arresting position, and conversely.

In this embodiment the function section 2A can be comprised of metal and the actuation section 2B of an elastically compliant material, such as a synthetic material. This metallic implementation of the function section 2A ensures a reliable arresting and releasing function of the arresting tongues 6, while the actuation section 2B serves only for an actuation function and cannot be lost. As depicted in FIG. 3, in this case circumferential flange 18 is provided on the actuation section 2B.

LIST OF REFERENCE SYMBOLS

1 Coupling body
2 Clamping collar
2A Function section
2B Actuation section
3 Recess
4 Pipe
5 Stop
6 Arresting tongue(s)
7 Recess inlet
8 Outer side
9 First slope
10 Inner wall surface of the coupling body 1
11 Outer wall surface of pipe 4
12 Second slope
13 Front-side end
14 Outer O-ring seal
15 Inner O-ring seal
16 Edge
17 Tongue slope
18 Circumferential flange
19 O-ring seal
20 Sealing ring
21 Annular bead
22 Edge section [sic. Channel section]
23 Connection piece
24 Gap
25 O-ring seal
26 Latching tongue(s)
27 Axial slots
28 Projection
29 Circumferential groove

The invention claimed is:

1. A connecting device for a pipe, comprising:
a coupling body having an inner wall, a stop, a substantially cylindrical recess having an inlet, and a sloped surface extending radially inwardly from said inner wall in a direction toward said inlet; and
a clamping collar having at an inner end thereof at least one radially displaceable arresting tongue, with said clamping collar being receivable within said substantially cylindrical recess and for, when received within said substantially cylindrical recess at an axially inner starting position, slidably receiving a pipe until one end of the pipe abuts said stop,
such that when the pipe is slid away from said stop in a direction toward said inlet, along with said clamping collar being slid in the direction toward said inlet from the axially inner starting position to an axially outer arresting position, an outer side of said at least one radially displaceable arresting tongue cooperates with said sloped surface so as to be displaced radially into engagement with an outer wall surface of the pipe,
wherein said clamping collar is divided into an axially inner function section and an axially outer actuation section, with a seal positioned between facing front sides of said axially inner function section and said axially outer actuation section, said seal for sealing against said inner wall and against the outer wall surface of the pipe, and with said axially inner function section having said at least one radially displaceable arresting tongue.

2. The connecting device according to claim 1, wherein said at least one radially displaceable arresting tongue is to spread radially outwardly upon being slid from the axially outer arresting position to the axially inner starting position.

3. The connecting device according to claim 2, further comprising:
another sloped surface extending radially inwardly from said inner wall in a direction toward said inlet, said another sloped surface being positioned such that said at least one radially displaceable arresting tongue is to spread radially outwardly upon being slid from the axially outer arresting position to the axially inner starting position by virtue of said another sloped surface cooperating with a front-side end of said at least one arresting tongue as a ramp-up slope so as to radially outwardly spread said at least one radially displaceable arresting tongue.

4. The connecting device according to claim 2, wherein said seal comprises an O-ring seal.

5. The connecting device according to claim 4, wherein said axially outer actuation section has at least one radially displaceable latching tongue at an outer end thereof, said at least one radially displaceable latching tongue having a radially outwardly directed projection that is to engage within a circumferential groove in said inner wall of said coupling body.

6. The connecting device according to claim 5, wherein said circumferential groove is of such a width that it permits axial displacement of said radially outwardly directed projection when received therein to such an extent that said axially inner function section can be displaced back and forth between the axially inner starting position and the axially outer arresting position.

7. The connecting device according to claim 5, wherein said at least one radially displaceable latching tongue comprises at least two radially displaceable latching tongues uniformly distributed over a circumference of said axially outer actuation section.

8. The connecting device according to claim 4, further comprising:
   another sloped surface extending radially inwardly from said inner wall in a direction toward said inlet, said another sloped surface being positioned such that said at least one radially displaceable arresting tongue is to spread radially outwardly upon being slid from the axially outer arresting position to the axially inner starting position by virtue of said another sloped surface cooperating with a front-side end of said at least one arresting tongue as a ramp-up slope so as to radially outwardly spread said at least one radially displaceable arresting tongue.

9. The connecting device according to claim 8, wherein said front-side end of said at least one radially displaceable arresting tongue has an identically directed tongue slope that cooperates with said another sloped surface.

10. The connecting device according to claim 4, wherein said clamping collar has a circumferential flange at an outer end thereof.

11. The connecting device according to claim 10, wherein said axially outer actuation section includes said circumferential flange.

12. The connecting device according to claim 4, wherein said O-ring seal is adjacent said inlet.

13. The connecting device according to claim 4, wherein said at least one radially displaceable arresting tongue has a sharp edge on a side facing the outer wall surface of the pipe when the pipe is received within said clamping collar.

14. The connecting device according to claim 4, wherein said sloped surface is defined by an annular bead circumferentially extending along said inner wall of said coupling body.

15. The connecting device according to claim 4, wherein said at least one radially displaceable arresting tongue comprises at least two radially displaceable arresting tongues uniformly distributed over a circumference of said clamping collar.

16. The connecting device according to claim 4, wherein said axially inner function section is of metal and said axially outer actuation section is of an elastically compliant material.

17. The connecting device according to claim 1, wherein said at least one radially displaceable arresting tongue has a sharp edge on a side facing the outer wall surface of the pipe when the pipe is received within said clamping collar.

18. The connecting device according to claim 1, wherein said clamping collar has a circumferential flange at an outer end thereof.

19. The connecting device according to claim 1, wherein said axially outer actuation section has at least one radially displaceable latching tongue at an outer end thereof, said at least one radially displaceable latching tongue having a radially outwardly directed projection that is to engage within a circumferential groove in said inner wall of said coupling body.

20. The connecting device according to claim 1, wherein said axially inner function section is of metal and said axially outer actuation section is of an elastically compliant material.

* * * * *